United States Patent
Wang et al.

(10) Patent No.: US 8,150,123 B2
(45) Date of Patent: Apr. 3, 2012

(54) SYSTEM AND METHOD FOR IMAGE ENHANCEMENT OF DARK AREAS OF CAPSULE IMAGES

(75) Inventors: Kang-Huai Wang, Saratoga, CA (US); Jiafu Luo, Irvine, CA (US)

(73) Assignee: Capso Vision Inc., Saratoga ( * ) Notice: Subject to any disclaimer, the term of this patent is extended or adjusted under 35 U.S.C. 154(b) by 309 days.

(21) Appl. No.: 12/625,570

(22) Filed: Nov. 25, 2009

(65) Prior Publication Data

US 2011/0122241 A1  May 26, 2011

(51) Int. Cl.
    *G06K 9/00* (2006.01)
(52) U.S. Cl. .................. 382/128; 382/274; 600/101
(58) Field of Classification Search .............. 382/128
    See application file for complete search history.

(56) References Cited

U.S. PATENT DOCUMENTS

| | | | |
|---|---|---|---|
| 5,867,594 A * | 2/1999 | Cymbalski | 382/192 |
| 5,867,595 A * | 2/1999 | Cymbalski | 382/192 |
| 7,283,683 B1 * | 10/2007 | Nakamura et al. | 382/274 |
| 7,684,639 B2 * | 3/2010 | Zhao et al. | 382/274 |
| 7,684,640 B2 * | 3/2010 | Zhao et al. | 382/274 |
| 7,813,590 B2 * | 10/2010 | Horn et al. | 382/284 |
| 7,899,240 B2 * | 3/2011 | Ekstrand et al. | 382/154 |
| 7,932,938 B2 * | 4/2011 | Subbotin | 348/247 |
| 2006/0140477 A1 * | 6/2006 | Kurumisawa et al. | 382/169 |
| 2007/0098379 A1 | 5/2007 | Wang et al. | |
| 2008/0049125 A1 * | 2/2008 | Subbotin | 348/241 |
| 2008/0100928 A1 | 5/2008 | Wilson | |
| 2008/0123954 A1 * | 5/2008 | Ekstrand et al. | 382/173 |
| 2011/0007192 A1 * | 1/2011 | Watanabe | 348/243 |
| 2011/0122241 A1 * | 5/2011 | Wang et al. | 348/65 |
| 2011/0221926 A1 * | 9/2011 | Kanaev et al. | 348/222.1 |

* cited by examiner

*Primary Examiner* — Sath V Perungvoor
(74) *Attorney, Agent, or Firm* — Blairtech Solution LLC

(57) ABSTRACT

Systems and methods are provided for identifying dark areas in images captured by encapsulated cameras or endoscopes and enhancing the visibility of the dark area using intensity stretch. For capsule or endoscope images, there are often some dark areas caused by inadequate lighting. The poor visibility of detailed features in the dark area may reduce the detection rate of anomaly. The present invention calls for a method to detect the dark area based on contour. The intensities inside and outside the dark area are evaluated and are used to generate intensity transformation to stretch intensity in the dark area while minimizing the impact on the image quality outside the dark area.

26 Claims, 11 Drawing Sheets

SYSTEM AND METHOD FOR IMAGE ENHANCEMENT OF DARK AREAS OF CAPSULE IMAGES

FIELD OF THE INVENTION

The present invention relates to diagnostic imaging inside the human body. In particular, the present invention relates to image enhancement by intensity stretching of dark areas of images captured by encapsulated cameras or endoscopes.

BACKGROUND

Devices for imaging body cavities or passages in vivo are known in the art and include endoscopes and encapsulated cameras. Endoscopes are flexible or rigid tubes that pass into the body through an orifice or surgical opening, typically into the esophagus via the mouth or into the colon via the rectum. An image is formed at the distal end using a lens and transmitted to the proximal end, outside the body, either by a lens-relay system or by a coherent fiber-optic bundle. A conceptually similar instrument might record an image electronically at the distal end, for example using a CCD or CMOS array, and transfer the image data as an electrical signal to the proximal end through a cable. Endoscopes allow a physician control over the field of view and are well-accepted diagnostic tools. However, they do have a number of limitations, present risks to the patient, are invasive and uncomfortable for the patient, and their cost restricts their application as routine health-screening tools.

Because of the difficulty traversing a convoluted passage, endoscopes cannot reach the majority of the small intestine and special techniques and precautions, that add cost, are required to reach the entirety of the colon. Endoscopic risks include the possible perforation of the bodily organs traversed and complications arising from anesthesia. Moreover, a trade-off must be made between patient pain during the procedure and the health risks and post-procedural down time associated with anesthesia. Endoscopies are necessarily inpatient services that involve a significant amount of time from clinicians and thus are costly.

An alternative in vivo image sensor that addresses many of these problems is capsule endoscope. A camera is housed in a swallowable capsule, along with a radio transmitter for transmitting data, primarily comprising images recorded by the digital camera, to a base-station receiver or transceiver and data recorder outside the body. The capsule may also include a radio receiver for receiving instructions or other data from a base-station transmitter. Instead of radio-frequency transmission, lower-frequency electromagnetic signals may be used. Power may be supplied inductively from an external inductor to an internal inductor within the capsule or from a battery within the capsule.

A capsule camera system with on-board data storage was disclosed in the U.S. patent application Ser. No. 11/533,304, entitled "In Vivo Autonomous Camera with On-Board Data Storage or Digital Wireless Transmission in Regulatory Approved Band," filed on Sep. 19, 2006. This application describes a capsule system using on-board storage such as semiconductor nonvolatile archival memory to store captured images. After the capsule passes from the body, it is retrieved. Capsule housing is opened and the images stored are transferred to a computer workstation for storage and analysis.

The above mentioned capsule cameras use forward looking view where the camera looks toward the longitude direction from one end of the capsule camera. It is well known that there are sacculations that are difficult to see from a capsule that only sees in a forward looking orientation. For example, ridges exist on the walls of the small and large intestine and also other organs. These ridges extend somewhat perpendicular to the walls of the organ and are difficult to see behind. A side or reverse angle is required in order to view the tissue surface properly. Conventional devices are not able to see such surfaces, since their FOV is substantially forward looking. It is important for a physician to see all areas of these organs, as polyps or other irregularities need to be thoroughly observed for an accurate diagnosis. Since conventional capsules are unable to see the hidden areas around the ridges, irregularities may be missed, and critical diagnoses of serious medical conditions may be flawed.

A camera configured to capture a panoramic image of an environment surrounding the camera is disclosed in U.S. patent application Ser. No. 11/642,275, entitled "In vivo sensor with panoramic camera" and filed on Dec. 19, 2006. The panoramic camera is configured with a longitudinal field of view (FOV) defined by a range of view angles relative to a longitudinal axis of the capsule and a latitudinal field of view defined by a panoramic range of azimuth angles about the longitudinal axis such that the camera can capture a panoramic image covering substantially a 360 degree latitudinal FOV.

For capsule systems, with either digital wireless transmission or on-board storage, the captured images will be played back for analysis and examination. During playback, the diagnostician wishes to find polyps or other points of interest as quickly and efficiently as possible. The playback can be at a controllable frame rate and may be increased to reduce viewing time. A main purpose for the diagnostician to view the video is to identify polyps or other points of interest. In other words, the diagnostician is performing a visual cognitive task on the images. Therefore, it is desirable to have a video display system which will make the diagnostic viewing easy for identifying potential anomalies and increase the rate of detection. Sometimes there are dark areas in the captured images which make it hard to identify features within the dark areas. The capsule endoscope does not insufflate the gastrointestinal tract sufficiently as standard colonoscopy or virtual colonoscopy, which may cause portions of the gastrointestinal tract to become folded. The wall of the folded tract may not receive adequate lighting and consequently renders itself as dark areas in the captured image. Inside each of these dark areas, the real mucosa surface area is much larger than it appears in the captured image due to its perspective view. Therefore, the dark areas represent a substantial percentage of the GI tract mucosa area, especially for colon, where polyps or other pre-cancerous or even cancerous pathologies could exist and need to be detected. While a conventional endoscope may be less susceptible to the issue of folded lumen walls, the situation may still occur and causes dark areas in the captured images. It is desirable to use image processing techniques to enhance the image quality of the dark areas of captured images to help improve the visibility of features in the dark areas and improve the detection rate consequently. Furthermore, the developed technology should have no impact or minimum impact on the quality of non-dark areas. In addition, it may offer the diagnostician a further advantage by providing interactive control related to intensity stretch of the dark areas.

SUMMARY

The present invention provides methods and systems for enhancing image quality of an image sequence generated from encapsulated cameras or endoscopes by stretching intensity in the dark areas of the image. In one embodiment of the present invention, a method for identifying dark areas is disclosed and image enhancement by intensity stretch is applied to the identified dark areas accordingly. In another aspect of the present invention, the intensities inside and surrounding the identified dark areas are determined and the inside intensity and the surrounding intensity are used to determine a proper intensity transfer curve that will enhance the visibility of the dark areas while minimizing the quality impact on non-dark areas. In yet another embodiment of the present invention, contour detection is used to identify the dark areas wherein the intensity of the area enclosed by the contour is used to determine whether the enclosed area is a dark area. In an alternative embodiment of the present invention, a dark area detection method is based on the cluster of dark pixels. In another embodiment of the present invention, the capsule image is divided into sub-images and the dark area determination is based on the sub-image.

DETAILED DESCRIPTION OF THE INVENTION

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention.

Reference throughout this specification to "one embodiment," "an embodiment," or similar language means that a particular feature, structure, or characteristic described in connection with the embodiment may be included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of apparatus and methods that are consistent with the invention as claimed herein.

Figure 1:
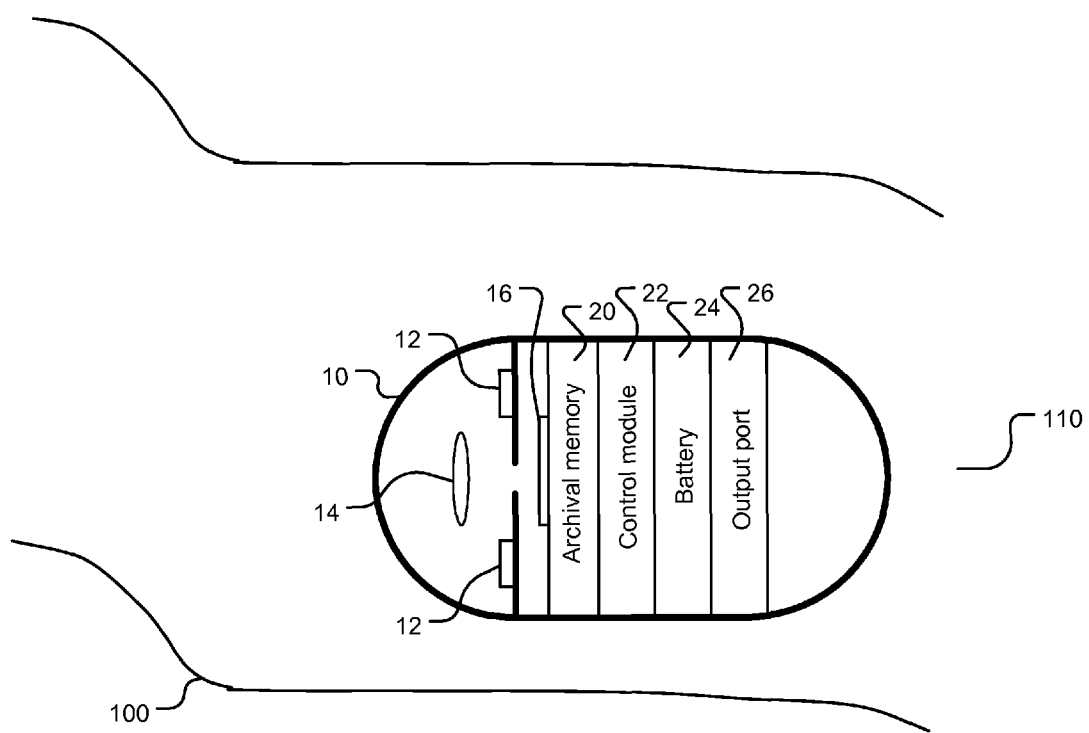
FIG. 1 shows schematically a capsule camera system in the GI tract, where archival memory is used to store capsule images to be analyzed and/or examined.

The present invention discloses methods and systems for enhancing the visibility of dark areas of images captured by a capsule camera system. The images may be received from a capsule camera system having on-board archival memory to store the images or received from a capsule camera having wireless transmission module. FIG. 1 shows a encapsulated cameras system 110, which is also referred to as a swallowable capsule system 110, inside body lumen 100, in accordance with one embodiment of the present invention. Lumen 100 may be, for example, the colon, small intestines, the esophagus, or the stomach. Capsule system 110 is entirely while inside the body, with all of its elements encapsulated in a capsule housing 10 that provides a moisture barrier, protecting the internal components from bodily fluids. Capsule housing 10 is transparent or at least partially transparent, so as to allow light from the light-emitting diodes (LEDs) of illuminating system 12 to pass through the wall of capsule housing 10 to the lumen 100 walls, and to allow the scattered light from the lumen 100 walls to be collected and imaged within the capsule. Capsule housing 10 also protects lumen 100 from direct contact with the foreign material inside capsule housing 10. Capsule housing 10 is provided a shape that enables it to be swallowed easily and later to pass through of the GI tract. Generally, capsule housing 10 is sterile, made of non-toxic material, and is sufficiently smooth to minimize the chance of lodging within the lumen.

As shown in FIG. 1, capsule system 110 includes illuminating system 12 and a camera that includes optical system 14 and image sensor 16. A semiconductor nonvolatile archival memory 20 may be provided to allow the images to be retrieved at a docking station outside the body, after the capsule is recovered. System 110 includes a control module 22, a battery power supply 24 and an output port 26. Capsule system 110 may be propelled through the GI tract by peristalsis.

Illuminating system 12 may be implemented by LEDs. In FIG. 1, the LEDs are located adjacent the camera's aperture, although other configurations are possible. The light source may also be provided, for example, behind the aperture. Other light sources, such as laser diodes, may also be used. Alternatively, white light sources or a combination of two or more narrow-wavelength-band sources may also be used. White LEDs are available that may include a blue LED or a violet LED, along with phosphorescent materials that are excited by the LED light to emit light at longer wavelengths. The portion of capsule housing 10 that allows light to pass through may be made from bio-compatible glass or polymer.

Optical system 14, which may include multiple refractive, diffractive, or reflective lens elements, provides an image of the lumen walls on image sensor 16. Image sensor 16 may be provided by charged-coupled devices (CCD) or complementary metal-oxide-semiconductor (CMOS) type devices that convert the received light intensities into corresponding electrical signals. Image sensor 16 may have a monochromatic response or include a color filter array such that a color image may be captured (e.g. using the RGB or CYM representations). The analog signals from image sensor 16 are preferably converted into digital form to allow processing in digital form. Such conversion may be accomplished using an analog-to-digital (A/D) converter, which may be provided inside the sensor (as in the current case), or in another portion inside capsule housing 10. The A/D unit may be provided between image sensor 16 and the rest of the system. LEDs in illuminating system 12 are synchronized with the operations of image sensor 16. One function of control module 22 is to control the LEDs during image capture operation. The control module 22 typically includes a processor such as a microcontroller or a digital signal processor which can be configured to provide various control tasks as required by the capsule camera system. The control tasks may also include image capture control, managing archival memory, battery power management, image upload control, and etc. While the control module 22 is shown as a centralized module responsible for all control tasks required, the implementation of the control module may also be distributed in various modules for the respective tasks. For example, the image capture control may be implemented in the hardware associated with image processing.

After the capsule camera traveled through the GI tract and exits from the body, the capsule camera is retrieved and the images stored in the archival memory are read out through the output port. The received images are usually transferred to a base station for processing and for a diagnostician to examine. The accuracy as well as efficiency of diagnostics is most important. A diagnostician is expected to examine all images and correctly identify all anomalies. In order to help the diagnostician to perform the examination more efficiently without compromising the quality of examination, the received images are subject to processing of the present invention by slowing down where the eyes may need more time to identify anomalies and speeding up where the eyes can quickly identify the anomalies.

Figure 2:
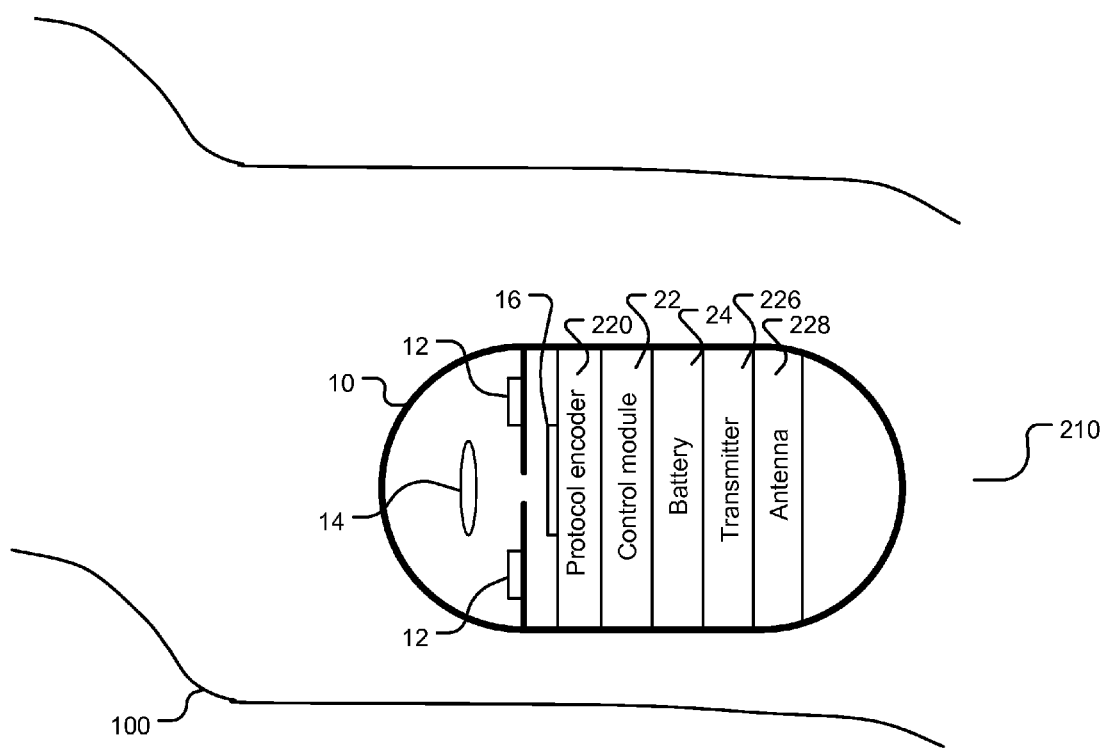
FIG. 2 shows schematically a capsule camera system in the GI tract, where wireless transmission is used to send capsule images to a base station for further analysis and/or examination.

FIG. 2 shows an alternative swallowable capsule system 210. Capsule system 210 may be constructed substantially the same as capsule system 110 of FIG. 1, except that archival memory system 20 and output port 26 are no longer required. Capsule system 210 also includes communication protocol encoder 220, transmitter 226 and antenna 228 that are used in the wireless transmission to transmit captured images to a receiving device attached or carried by the person being administered with a capsule system 210. The elements of capsule 110 and capsule 210 that are substantially the same are therefore provided the same reference numerals. Their constructions and functions are therefore not described here repeatedly. Communication protocol encoder 220 may be implemented in software that runs on a DSP or a CPU, in hardware, or a combination of software and hardware. Transmitter 226 and antenna system 228 are used for transmitting the captured digital image.

While encapsulated cameras are described above, the conventional endoscopes have been widely used in practice. The endoscope system is well known by those skilled in the art and the details are not repeated here. The conventional endoscope may be less susceptible to the issue of folded lumen walls; however, the situation may still occur and causes dark areas in the captured images.

Figure 3A:
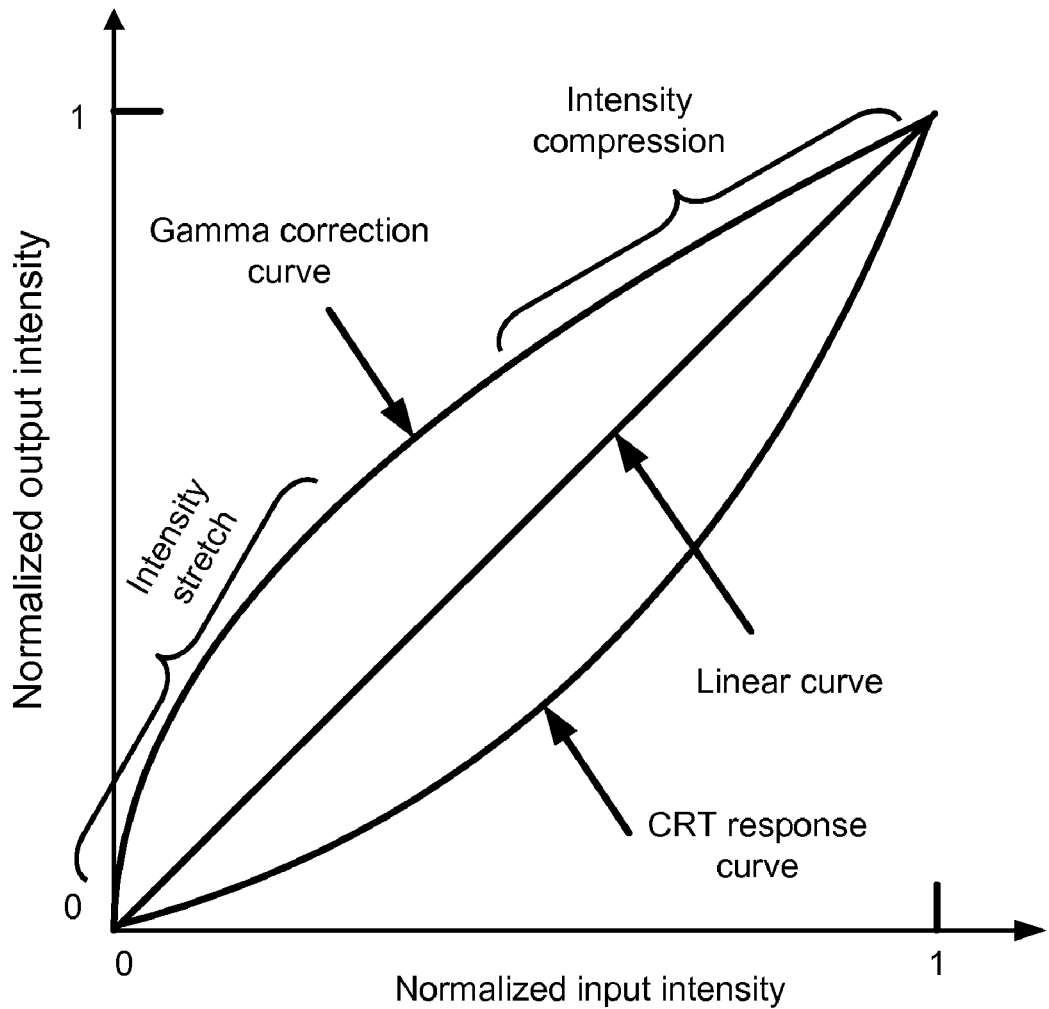
FIG. 3A shows an exemplary CRT display response curve and gamma correction curve.

For capsule systems, with either digital wireless transmission or on-board storage, the captured images will be played back for analysis and examination. During playback, the diagnostician wishes to find polyps or other points of interest as quickly and efficiently as possible. However, very often, capsule images may contain dark areas corresponding to areas not receiving enough lighting. On the other hand, the images from conventional endoscopes are often viewed in real-time on a display device. As mentioned earlier, the images from a conventional endoscope may also have the issue of dark areas. The detailed features in the dark area are hard to identify. However, a technique known as gamma correction may be used to improve the visibility of features in the dark area. Originally the gamma correction is intended for compensating the nonlinear response of CRT (Cathode-Ray Tube) display. The intensity of CRT display goes much brighter than the linear response for high input signal. A normalized CRT output intensity versus input signal curve is concave upward as shown in FIG. 3A. The CRT response curve is often described as a power function:

$$S_o = (S_i)^\gamma \qquad (1)$$

where $S_o$ is the output intensity, $S_i$ is the input signal to the CRT display, and $\gamma$ is a real-valued number, where $\gamma > 1$.

In order to compensate the nonlinear characteristics of CRT display, the signal to be displayed is subject to a transformation corresponding to the inverse function of the CRT response curve as prescribed in equation (1). This compensation technique is known in the art as gamma correction. Gamma correction is described by the relationship between the gamma-corrected signal $V_o$ and the signal to be displayed, $V_i$:

$$V_o = (V_i)^{1/\gamma}. \qquad (2)$$

When the gamma-corrected signal is displayed on a CRT display, the end-to-end linear characteristics will be preserved. The gamma correction curve and the resulting linear curve are also shown in FIG. 3A. The gamma correction curve shows characteristics that for the low-level input signal, the output range is larger than the input range (the slope is greater than 1). Consequently, the gamma correction curve having a gamma value ($\gamma$) greater than one will always stretch the intensity for low-level input.

Figure 3B:
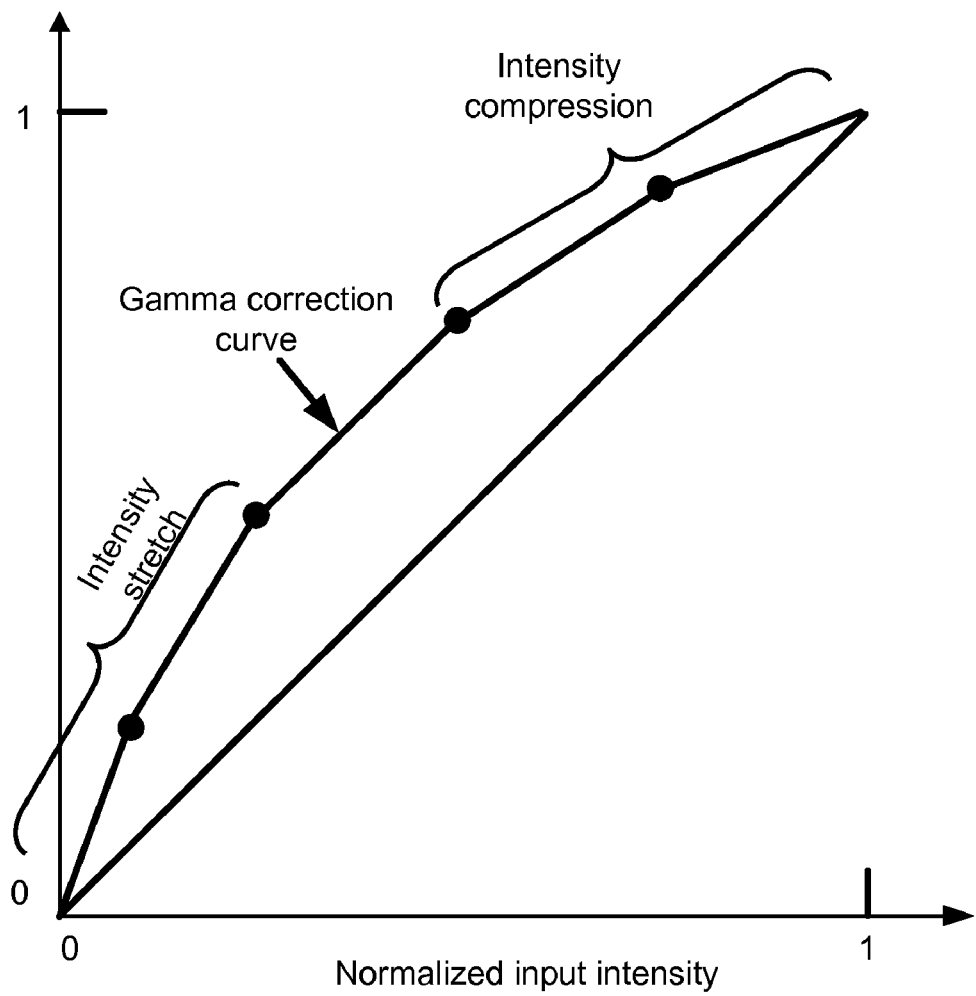
FIG. 3B shows an exemplary piecewise linear gamma correction curve.

Other type of intensity transformation may also be used, such as a piecewise linear function where the intensity transformation curve is modeled as segments of straight lines. For example, a piecewise linear curve is shown in FIG. 3B. The piecewise linear curve can be easily described as a first-order function. The gamma correction can be easily implemented either in software or hardware as a table-lookup function. For 8-bit data, the table size is 256 entries with 1 byte in each entry.

While gamma correction is originally designed to compensate the non-linearity of CRT display, the technique can be used for intensity stretch in the dark area by properly choosing an intensity transfer function. As discussed earlier, a typical gamma correction curve always stretches the intensity for dark area (lower intensities). The intensity transfer function describes the relationship between the intensity output and the intensity input. For capsule images to be displayed on a display device, the image may be subject to gamma correction depending on the characteristics of the display. In this case, the intensity stretch is applied to the image in addition to the gamma correction required to achieve end-to-end linearity. The conventional gamma correction will not be explicitly addressed in the following discussion. In other words, the display system is assumed to be linear. In the case that both the intensity stretch in the dark area and the conventional gamma correction are needed, individual steps can be implemented as separate table lookup operations or the combined processing can be implemented as a single table lookup.

The gamma correction curve described in equation (2) is a means to stretch intensity in the dark area. As shown in FIG. 3A, the curve has steep slope for the low-intensity input (darker pixels). Therefore, a smaller range of input signal is mapped to a larger range of output signal. In other words, the output intensity is "stretched" for darker pixels. The intensity differences in the dark area will be "amplified" so that the differences become more visible in the dark area. Since the total number of intensity levels for the input and output will be preserved, a "stretch" in the darker area implies that a "compression" in the brighter area. As shown in FIG. 3A, the slope for brighter pixels is less that 1. In other words, a wider input range in the brighter area is mapped to a narrower output range. Therefore the output range is "compressed" for brighter pixels. The intensity compression in the brighter area will cause the loss of shading in the bright area and result in an appearance of "washout". Overall, the intensity transformation using a gamma curve will stretch intensity in the dark area to enhance visibility of detailed features. However, it will compress intensity in the bright area and cause quality degradation. Therefore, the intensity stretch has to be used selectively to minimize the quality impact in the bright area. FIG. 3B shows an intensity transformation based on a piecewise linear curve which consists of multiple straight line segments. An advantage of piecewise linear curve is that the degree of stretch can be easily controlled by slope of each straight line segments. As described previously, a steeper line segment implies a higher degree stretching.

Figure 4A:
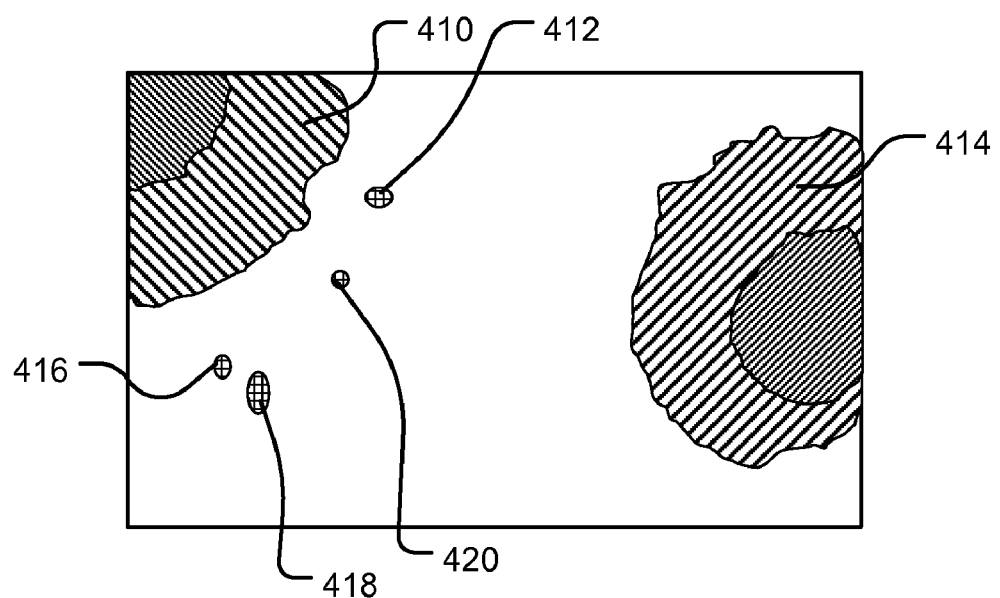
FIG. 4A shows an exemplary scene of a capsule image having multiple objects.

FIG. 4A illustrates a capsule image with multiple objects 410 to 420, where objects 410 and 414 contain dark areas. The drawing in FIG. 4A is just for illustration purpose and the objects may not be drawn to scale. Also, the number of intensity levels shown is very limited due to the limitation of line drawing. In a real capsule image, the number of intensity levels may be 256 or more. If intensity stretch is applied to the whole image, some features in the bright area may be washed out and cause quality degradation. However, if the intensity stretch is only applied to the dark areas, the quality degradation in the bright area may be minimized. Therefore, it is important to determine the dark areas in the capsule image and only apply the intensity stretch to these areas. One observation based on FIG. 4A is that the dark areas are often defined by their associated contours. If the contour for the dark area can be identified, the dark area may be identified accordingly. There are some known techniques in the field to identify contours and can be used for the present invention.

Figure 4B:
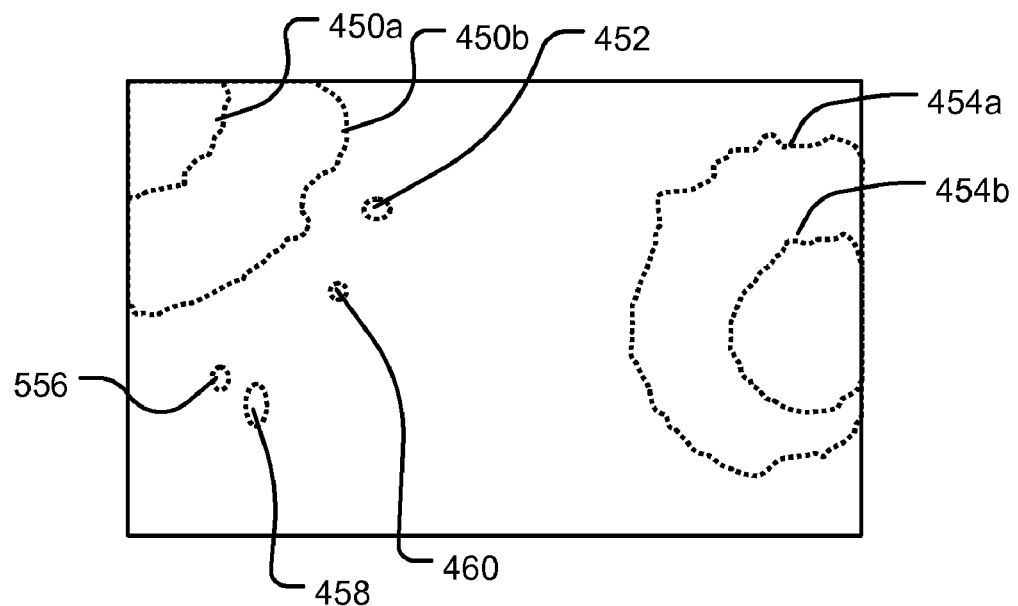
FIG. 4B shows exemplary contours of objects corresponding to FIG. 4A.

The terms of edge and contour may be used interchangeably in some contexts. However, often the contour is referring to connected edges corresponding to the boundary of an object. In this specification, the edge may be referring to an isolated edge or a connected edge (i.e., a contour). An exemplary illustration of a capsule image containing edges is shown in FIG. 4A where the image contains multiple objects labeled as 410-420. Image processing can be applied to the capsule image to extract the contours and edges of objects in the capsule image. An exemplary edge extraction corresponding to the image of FIG. 4A is shown in FIG. 4B, where the contours and edges extracted are labeled as 450-460. Some objects may have multiple shading and result in multiple contours or edges. For example, the object 410 results in two contours 450a and 450b. Also, the object 414 results in two contours 454a and 454b. There are many well known edge detection techniques in the literature. For example, the Sobel operator is a 3×3 digital filter that can be applied to the underlying image to detect the existence of a horizontal edge or a vertical edge. The horizontal Sobel operator $S_H$ is used to detect a horizontal edge and the vertical Sobel operator $S_V$ is used to detect a vertical edge, where $$S_H = \begin{bmatrix} +1 & +2 & +1 \\ 0 & 0 & 0 \\ -1 & -2 & -2 \end{bmatrix} \text{ and} \qquad (3)$$

$$S_V = \begin{bmatrix} +1 & 0 & -1 \\ +2 & 0 & -2 \\ +1 & 0 & -1 \end{bmatrix}$$

The horizontal and vertical Sobel operators are applied to the image and the results are compared with a threshold to determine if an edge, either horizontal or vertical, exists. If an edge is detected at a pixel, the pixel is assigned a "1" to indicate the existence of an edge; otherwise a "0" is assigned to the pixel. The binary edge map indicates the contours of an object in the image.

There are many other techniques for edge detection. For example, there are convolution masks that can be used to detect horizontal, vertical, +45° and −45° edges. The operators are named $C_H$, $C_V$, $C_{+45}$, and $C_{-45}$, corresponding to horizontal, vertical, +45° and −45° edge detection respectively, where $$C_H = \begin{bmatrix} -1 & -1 & -1 \\ +2 & +2 & +2 \\ -1 & -1 & -1 \end{bmatrix}, \qquad (3)$$

$$C_V = \begin{bmatrix} -1 & +2 & -1 \\ -1 & +2 & -1 \\ -1 & +2 & -1 \end{bmatrix},$$

$$C_{+45} = \begin{bmatrix} -1 & -1 & +2 \\ -1 & +2 & -1 \\ +2 & -1 & -1 \end{bmatrix} \text{ and}$$

$$C_{-45} = \begin{bmatrix} +2 & -1 & -1 \\ -1 & +2 & -1 \\ -1 & -1 & +2 \end{bmatrix}$$

After the convolution masks are applied to the image, the results are compared with a threshold to determine if an edge exists at a particular pixel. Accordingly, an edge map can be formed and the contour can be identified.

In FIG. 4A, the image shows two objects 410 and 414, both having dark areas in the center portion. By using edge detection and further image processing, contours 450a and 454b can be identified. The intensities for the areas enclosed by the contours can be calculated. If the intensity range is mostly low, the corresponding areas enclosed can be declared as dark areas. The corresponding dark areas detected are shown in FIG. 4B as indicated by the contours. The low intensity of the dark areas can be identified by the histogram for the areas enclosed by the contours. If the histogram shows that the intensity level is mostly confined in the low intensity region, the area may be declared as a dark area. Alternatively, the maximum intensity for the areas enclosed by the contours may be identified. If the maximum intensity is below a threshold, the corresponding area may be declared as a dark area. In order to enhance the visibility in the dark area, it is desirable to apply image intensity transformation to stretch the intensity in the dark area. Occasionally, there may be noises that cause some pixels to have very bright values. To avoid unreliable dark area detection, bright pixels in the outlier (i.e., a small number of pixels having intensity levels substantially higher than the normal intensity distribution) should be excluded from the maximum brightness decision. If the intensity of a pixel is substantially higher than those of its neighboring pixels, it is a good indication that the high intensity may be caused by noise. By excluding these pixels, it will make the calculation more reliable.

Since the total intensity levels usually is fixed (e.g., 256 levels for an 8-bit representation), stretching the intensity in the dark area will require compression in the bright area, which may cause image to lose dynamic range in the bright area. Consequently, the image in the bright area may appear to be washed out. Therefore it is desirable to apply the intensity transformation only to the areas wherever necessary. In the above example, it is desirable to apply the intensity transformation to the dark areas 450a and 454b only. For the areas outside the dark area, there may be some regions having intensities lower than the maximum intensity of the dark area. As long as these regions are not immediately next to the dark area, the intensity for all areas outside the dark areas (including these regions having intensities lower than the maximum intensity of the dark area) can remain intact after the intensity transformation. This is an advantage of the present invention that selectively and adaptively applies the intensity transformation to the identified dark area.

While a contour based approach is disclosed here as an example of dark area detection, there are also other techniques which may be used to detect the dark areas in the image. For example, a method based on clusters of dark pixels may used to detect dark areas. A dark pixel can be easily determined by comparing the intensity of the pixel against an intensity threshold. If the intensity is below the intensity threshold, the pixel is classified as a dark pixel. Due to the variations in image intensities as well as the characteristics of an underlying image, there may be some isolated dark pixels or connected dark pixels containing only a few pixels. However, if the cluster of dark pixels is larger enough, it may be considered as a dark area. The cluster of dark pixels is defined as a collection of dark pixels that are connected, i.e., every pixel in the cluster is connected to another pixel in the cluster directly or indirectly (through multiple connections). The criterion to determine whether the cluster of dark pixels is qualified as a dark area may be based on the width and height of the cluster of dark pixels, or the product of the width and the height of the cluster of dark pixels. For example, a width threshold and a height threshold can be selected. If the minimum width of the cluster of dark pixels is greater than the width threshold and the minimum height of the cluster of dark pixels is greater than the height threshold, the cluster of dark pixels is determined to be a dark area. The width of the cluster of dark pixels is defined as the maximum spread of the cluster of dark pixels in the horizontal direction. Similarly the height of the cluster of dark pixels is defined as the maximum spread of the cluster of dark pixels in the vertical direction. Alternatively, the criterion may be based on the product of the width and the height of the cluster of dark pixels. If the product is greater than an area threshold, the cluster of dark pixel is determined to be a dark area. The product corresponds to the minimum area that will contain the cluster of dark pixels. The intensity threshold, the width threshold, the height threshold, and the area threshold are empirically determined to result in a satisfactory visual result.

Figure 5A:
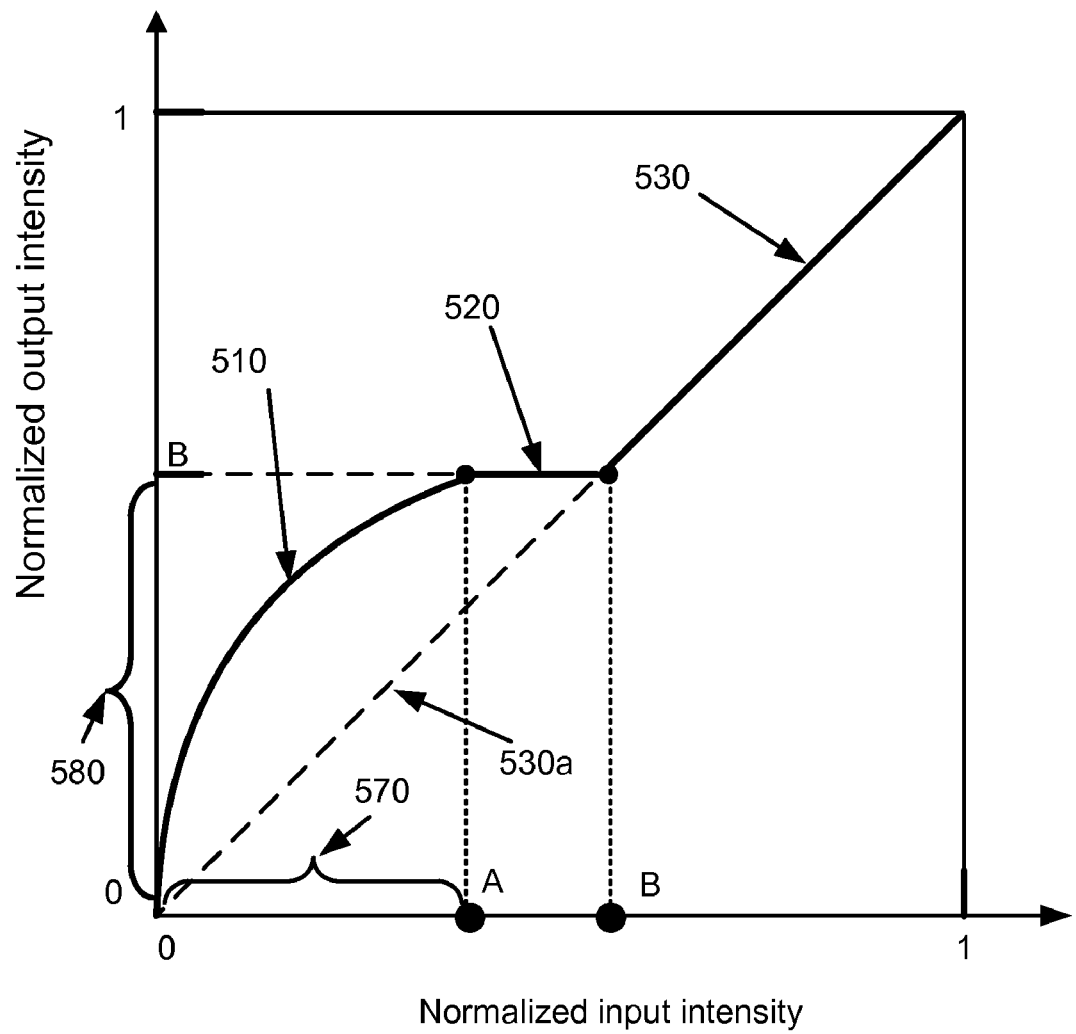
FIG. 5A illustrates an exemplary intensity transformation curve where the dark area intensity is stretched and the intensity outside the dark area is intact.

Upon the dark area detected using the contour based approach, intensity stretch can be applied to the identified dark areas. Since the dark areas are individually identified, the intensity stretch can be adaptively applied. Each dark area may have a different intensity range from other dark areas and its surrounding area may also have different intensity levels. Therefore, the best intensity transformation for one dark area intensity stretch may be different from the other dark area. FIG. 5A shows one example of dark area intensity stretch. The intensity range 570 within the dark area is between 0 and A, where A is the maximum intensity for pixels inside the dark area. As discussed earlier, the calculation of maximum intensity may have excluded isolated pixels having unusually higher intensity than the intensities of their neighboring pixels. The corresponding output range 580 is stretched to have a wider range than the input range 570 of the dark area. The intensity B is the intensity of pixels immediately outside the dark area.

Since the intensity of pixels immediately outside the dark area may not be uniform, the intensity B may be determined as the minimum intensity of the pixels immediately outside the dark area. Similarly, the minimum intensity may exclude pixels in the area that have unusually lower intensities than their neighboring pixels. The pixels at the boundary of the dark area may have sharp transition in intensity. In order to ensure that the pixels considered to be outside the dark areas do not inadvertently fall on the boundary of the dark area, only the pixels that are at a small distance (where 1-10 pixels are considered a small distance) from the detected contour are considered to be outside the dark area. This will extend the intensity B into a higher value and achieve more intensity stretch in the dark area without impact on quality of the area outside the dark area. In the following description, the pixels immediately outside the dark area may be modified to only include the pixels that are at a small distance (where 1-10 pixels are considered a small distance) from the detected contour of the dark area. The intensity B immediately outside the dark area will be brighter than the maximum intensity A of the dark area, i.e., B>A. In this case, intensity transformation may take advantage of this fact and use the output range between A and B for intensity stretch. Accordingly, the intensity transformation curve is shown in FIG. 5A as 3 segments 510, 520 and 530. The curve 510 is used for intensity stretch for the dark area, where a smooth curve complying with a power function of equation (2) is used. The segment 520 represents that all input data between A and B is mapped to this single output. Since there is no additional input data between A and B, this mapping will not result in any degradation. The line segment 530 is a one-to-one mapping and preserves all the original intensity levels. Sometimes, there may be some pixels outside the dark area having intensity level lower than intensity B. However, as long as these pixels are not immediately adjacent to the boundary of the dark area, the intensity of these pixels can remain intact. For those pixels outside the dark area that have intensities lower than B, the intensity transformation is governed by the dashed line 530a. As shown in FIG. 5A, the intensities of those pixels are intact after the intensity transformation because the output intensity equals the input intensity according to the dashed line 530a. Consequently the quality outside the dark area is preserved according to the intensity curve shown in FIG. 5A.

Figure 5B:
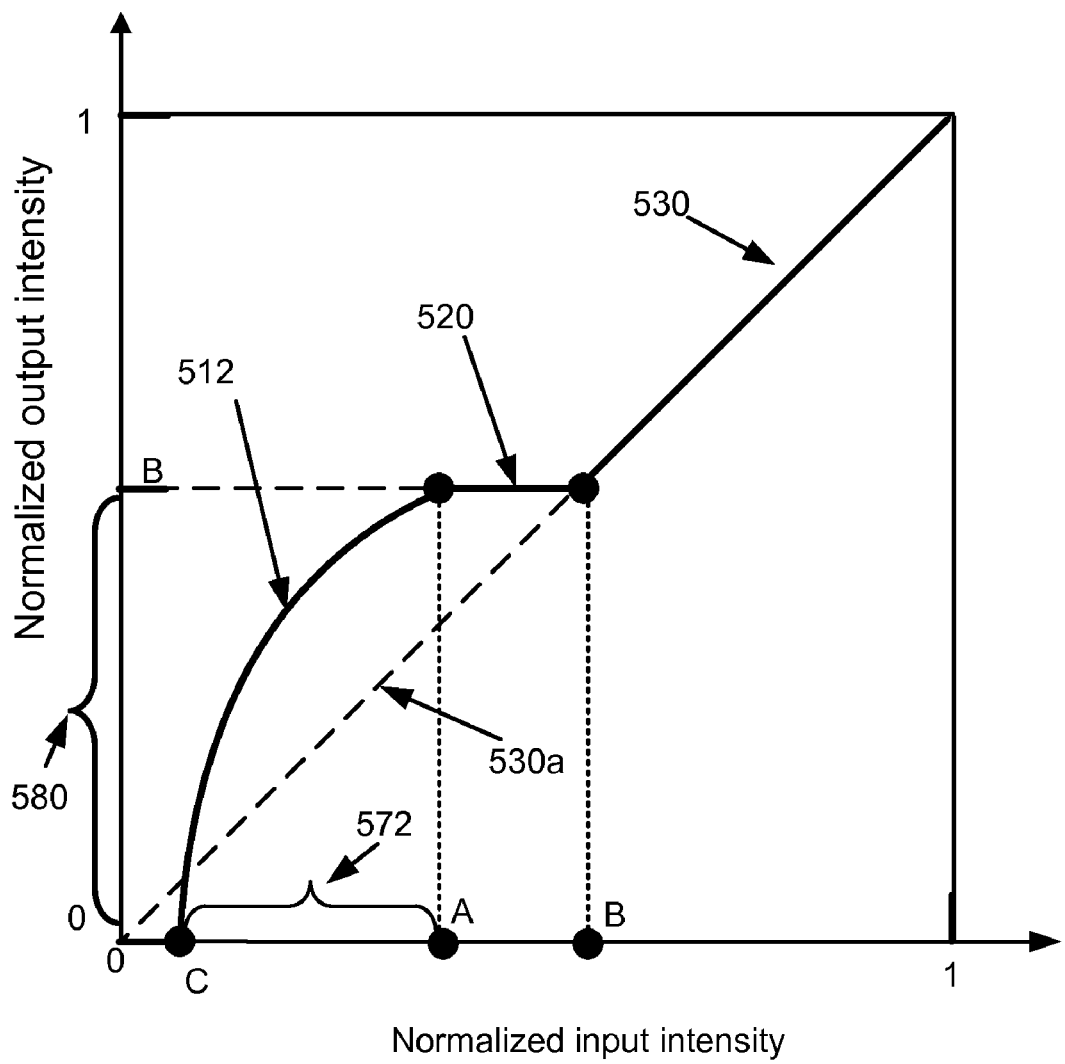
FIG. 5B illustrates an exemplary intensity transformation curve where the dark area intensity is stretched using a reduced input range and the intensity outside the dark area is intact.

In some images, the darkest intensity level may not reach 0. Therefore, there may be a small range of low-level intensities near 0 is not used. The intensity transformation may further take advantage of this fact by restrict the input range to the active intensity range. For example, the minimum intensity level within the dark area is C and the new mapping for the dark area is shown in FIG. 5B as the curve 512 for the input intensity range 572 from intensity C to intensity A. The curve 512 shown is a smooth curve complying with a power function of equation (2). Since the curve 512 starts at intensity C instead of 0, the corresponding power function has to be modified by a horizontal offset, i.e. $V_i$ is modified to $(V_i-C)$. Compared with the curve 510 in FIG. 5A, the curve 512 is steeper and provides more stretch. Again the pixels outside the dark areas remain intact since the intensity transformation is governed by the line segment 530 for intensities above B and by the dashed line 530a for intensities below B.

Figure 5C:
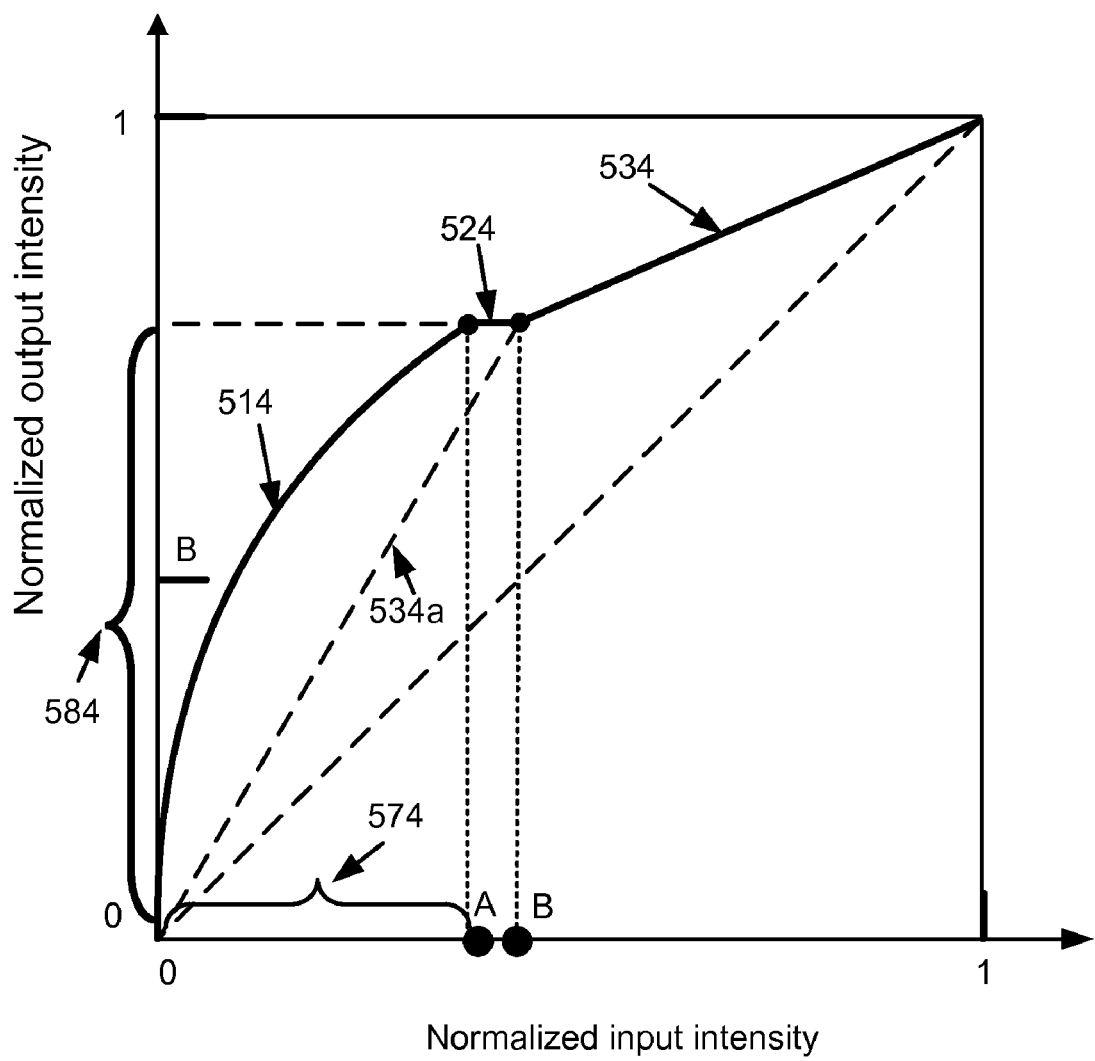
FIG. 5C illustrates an exemplary intensity transformation curve where the dark area intensity is stretched while the intensity outside the dark area is compressed.

While the examples in FIG. 5A and FIG. 5B show the cases that the intensity outside the dark areas is preserved. However, the intensities between inside and immediate outside of the dark area may not show any noticeable jump, i.e., the difference between A and B is small. Consequently, the method described in FIG. 5A may not provide enough intensity stretch. As a compromise to achieve better dark area intensity stretch with slight intensity compression in the bright area, another intensity transformation is shown in FIG. 5C. Compared with the curve 510 of FIG. 5A, the curve 514 is steeper and provides wider output range, where the curve 514 complies with a power function of equation (2). The line segment 534 corresponding to the intensity transformation for the brighter area outside the dark area. The line segment 534 has a slope less than 1 and causes the output intensity slightly compressed. The input intensity from A to B is mapped into a single value as shown by the horizontal line segment 524 of FIG. 5C. Again, there may be some pixels outside the dark area having intensity level lower than intensity B. For those pixels outside the dark area that have intensities lower than B, the intensity transformation is governed by the dashed line 534a. As shown in FIG. 5C, the intensities of those pixels are slightly stretched after the intensity transformation because the dashed line 534a has a slope larger than 1. Other smooth curves may also be used for intensity transformation of pixels outside the dark area having intensities lower than B. The examples shown in FIGS. 5A-C are for illustration purpose and other types of intensity transformation can be used. For example, the line segment 530 and 534 do not have to be linear. Any continuous curve that achieves intensity compression may serve the purpose.

Figure 5D:
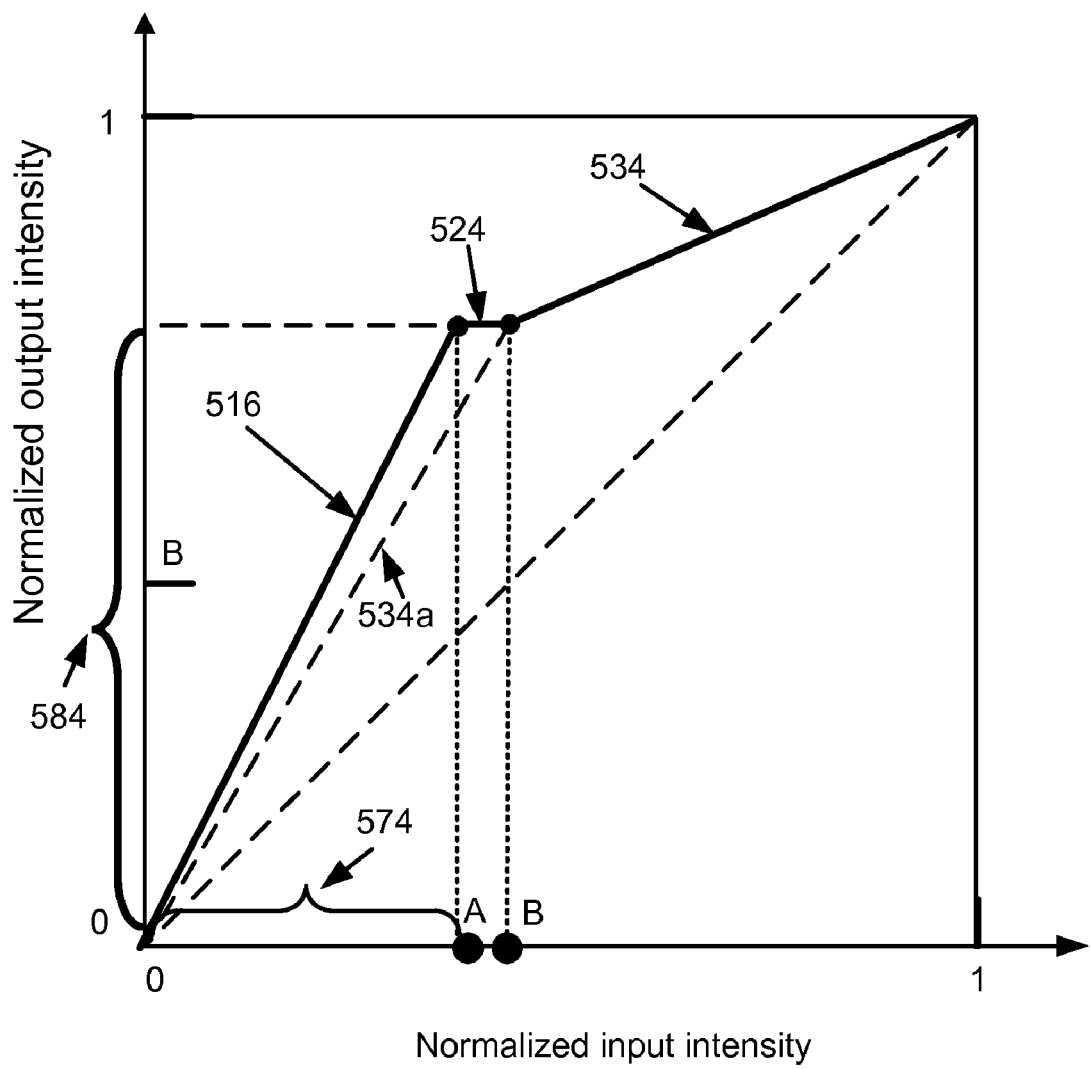
FIG. 5D illustrates an exemplary intensity transformation curve where the dark area intensity is stretched using a linear transformation while the intensity outside the dark area is compressed.
Figure 5E:
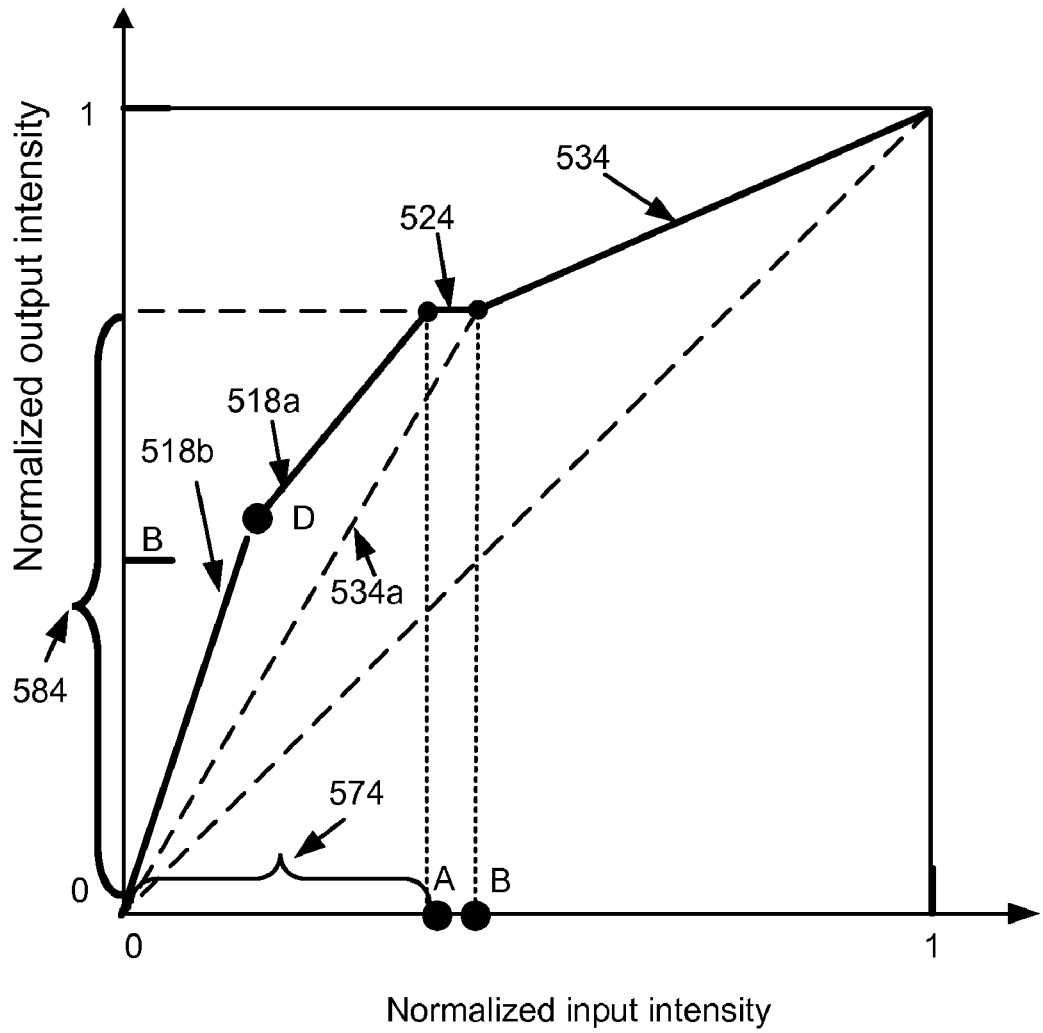
FIG. 5E illustrates an exemplary intensity transformation curve where the dark area intensity is stretched using a piecewise linear transformation while the intensity outside the dark area is compressed.

The intensity transformation illustrated in the examples shown in FIGS. 5A-C complies with a power function of equation (2). However, as mentioned previously, a piecewise linear function may also be used for intensity stretching of dark areas. For example, the intensity transformation 514 in FIG. 5C for dark area can be replaced with a straight line 516 as shown in FIG. 5D. Since the same slope is applied to all pixels in the dark area, all pixels in the dark area receive the same degree of intensity stretch. It may be desirable to emphasize more stretch intensity for darker pixels in the dark area. For example, two line segments 518a and 518b joined at D can be used, as shown in FIG. 5E, instead of the single line segment 516 of FIG. 5D. The line segment 518b has a larger slope than the line segment 518a. Therefore, the darker pixels receive a higher degree of intensity stretching than the brighter pixels in the dark area.

While a contour based technique is disclosed here to adaptively apply the intensity stretch, there will be some computations required to determine the edges and contours of the images. There are also other techniques that only require very small amount of computation. For example, an image may be divided into smaller units, called sub-image. The intensity transformation is adaptively applied to a whole sub-image if the sub-image is determined to be "dark". The criterion of a dark sub-image may be based upon the intensity histogram or the maximum intensity of the sub-image. For example, the peak of the histogram can be used as an indication about the general intensity level. If the peak histogram occurs at an intensity level below a threshold, the sub-image may be considered as a dark area. Alternatively, the maximum intensity level of a sub-image can be used to determine whether it is a dark area. If the maximum intensity level is below a threshold, the sub-image may be determined to be a dark area. The sub-images may be formed by dividing the image into units of substantially equal size in a one-dimension or two-dimension fashion. For example, an image may be divided into M×N sub-images (horizontally M equal parts and vertically N equal parts) where M and N are integers.

The number of capsule images to be viewed is large. The processing for dark area identification and dark area intensity stretch should be done by automatic processing such as computer or high-speed signal processors to save diagnostician's time. However, a diagnostician may occasionally stop the sequence to focus on some images that the diagnostician may suspect anomaly. When the sequence is stopped, the diagnostician may have the opportunity to selectively choose a proper intensity transformation that may best achieve the intensity stretch for the particular dark area. For example, by selecting a dark area using the cursor on the display screen, an interactive adjustable intensity transformation curve may be displayed in a sub-window for the diagnostician to manipulate the intensity transformation. This may provide a convenient tool for the diagnostician to quickly zoom in some suspicious image areas for further detailed diagnosis.

An interactive adjustable curve is well known for those in the art. For example, an intensity transformation curve complying with a power function or a piecewise linear curve may be used as an adjustable curve. The cursor position on the screen usually is control by a pointing device such as a computer mouse or a track ball. The cursor can be placed on the curve and the curve can then be dragged by signaling to the display device (e.g., holding down a push button on the pointing device or holding down a key on an input device to control the display device) while moving the pointing device. In a typical pointing device such as a mouse, there are often buttons (e.g., a left button and a right button on a mouse for personal computer) for a user to send signal to the computer. The buttons are often implemented using momentary-type switch (pushing to make the contact and releasing to disengage the contact). In the present embodiment, if the cursor is placed on the curve and the button is pressed, this may serve to indicate to the display system that the user wants to change the intensity transformation curve. By keeping the button pressed, the movement of the cursor will change the shape of the curve according to the new cursor position (called "dragging" in the art). When a desired curve adjustment is achieved, the button is released. The button used for the purpose of signaling to the display system is termed selection button. While the select button is often located on the mouse, it may also be implemented separately from the mouse. For example, a key on a keyboard or a dedicated button may serve this purpose. While a momentary-type switch is often used for this selection button, a toggle type switch may also be used. The shape of the curve is then changed depending on the location dragged. For example, if the power function is used and the curve is dragged outward (i.e., toward the upper left direction), the movement will cause more intensity stretch in the dark areas (i.e., larger γ). Conversely, if the curve is dragged inward (i.e., toward the lower right direction), the movement will cause less intensity stretch in the dark areas (i.e., smaller γ). For piecewise linear curve, similar shape adjustment can be applied. Alternatively, the joint between two line segments can be used as a control point. For example, the joint D of the two segments 518*a* and 518*b*, as shown in FIG. 5E, can be dragged to a different location to change the desired piecewise linear intensity transformation. This method is convenient for cases where the number of line segments is small.

Figure 6:
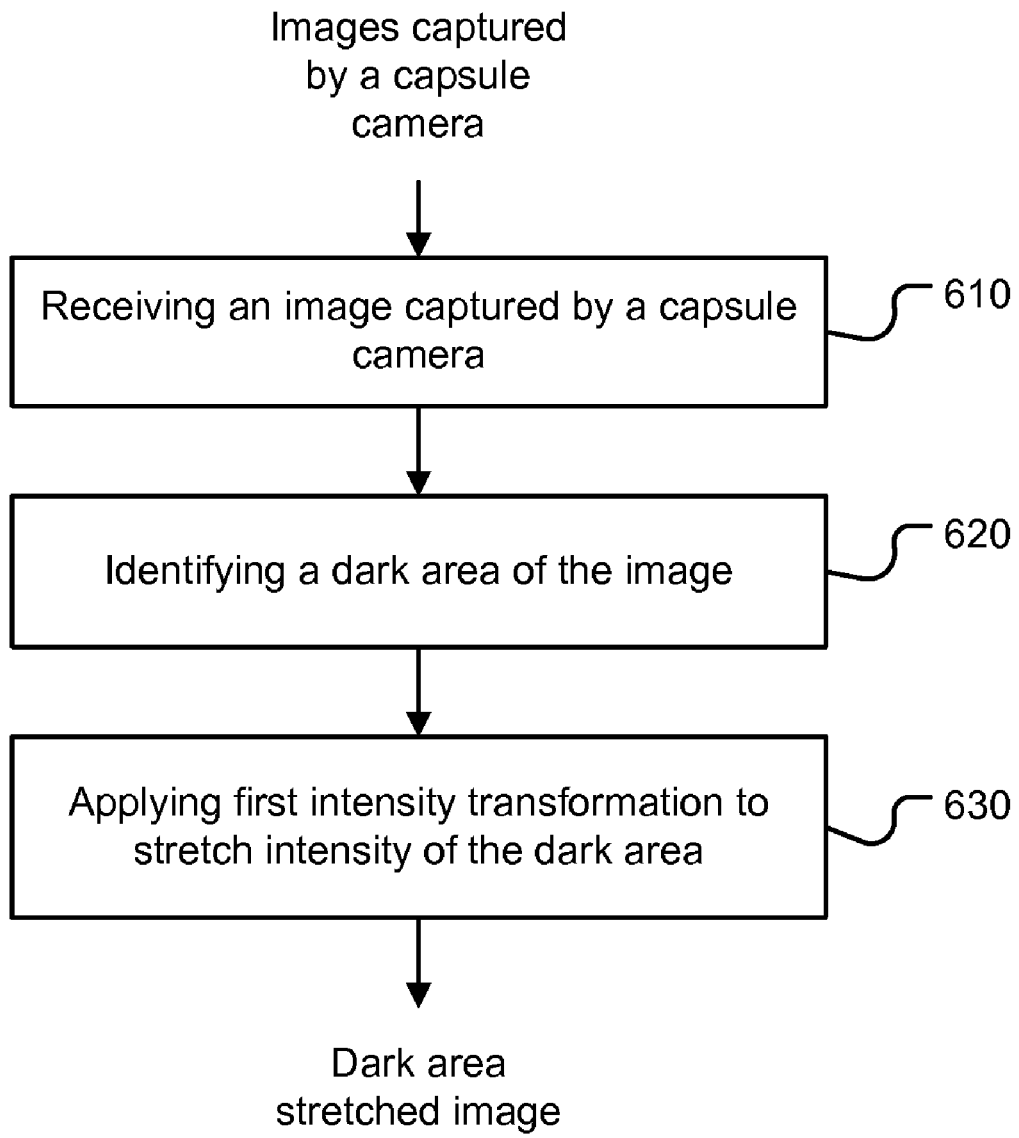
FIG. 6 shows a flowchart of processing steps corresponding to a system embodying the present invention.

FIG. 6 shows a flowchart for processing steps of a system embodying the present invention. The images captured by a capsule camera are received at step 610. The dark areas of the image are identified at step 620. At step 630, intensity transformation is applied to stretch the intensity of the dark area.

The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware codes may be developed in different programming languages and different format or style. The software code may also be compiled for different target platform. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method for processing images from encapsulated cameras or endoscopes, the method comprising:
   receiving an image captured by encapsulated cameras or endoscopes;
   detecting a cluster of dark pixels in the image having intensities below an intensity threshold;
   identifying a dark area of the image;
   applying first intensity transformation to stretch intensity of the dark area; and
   wherein identifying a dark area of the image is based on a width of the cluster of dark pixels being greater than a width threshold and a height of the cluster of dark pixels being greater than a height threshold.

2. The method of claim 1, further comprising detecting a contour of an object in the image and identifying intensities of an area enclosed by the contour.

3. The method of claim 2, wherein identifying a dark area of the image is further based on the intensities of the area enclosed by the contour.

4. The method of claim 1, further comprising dividing the image into sub-images.

5. The method of claim 4, further comprising identifying intensities of the sub-image.

6. The method of claim 5, wherein identifying a dark area of the image is further based on the intensities of the sub-image.

7. The method of claim 1, wherein identifying a dark area of the image is further based on a product of a width and a height of the cluster of dark pixels being greater than an area threshold.

8. The method of claim 1, wherein the first intensity transformation is related to a maximum intensity inside the dark area and a minimum intensity of pixels immediately outside the dark area.

9. The method of claim 1, wherein the first intensity transformation is related to a maximum intensity inside the dark area and a minimum intensity of pixels at a small distance outside the dark area.

10. The method of claim 8, wherein the first intensity transformation is further related to a minimum intensity inside the dark area.

11. The method of claim 9, wherein the first intensity transformation is further related to a minimum intensity inside the dark area.

12. The method of claim 1, further comprising second intensity transformation to adjust intensities outside the dark area.

13. A system for processing images from encapsulated cameras or endoscopes, the system comprising:
   an input interface module coupled to receive an image from encapsulated cameras or endoscopes;
   a first processing module configured to detect a dark area of the received image;
   a second processing module configured to apply first intensity transformation to stretch intensity of the dark area; and
   wherein the first processing module is further configured to detect a cluster of dark pixels in the image having intensities below an intensity threshold and identify the dark area of the image based on a width of the cluster of dark pixels being greater than a width threshold and a height of the cluster of dark pixels being greater than a height threshold.

14. The method of claim 13, wherein the first processing module is further configured to detect a contour of an object in the image and to identify intensities of an area enclosed by the contour.

15. The method of claim 14, wherein the first processing module is further configured to identify the dark area of the image based on the intensities of the area enclosed by the contour.

16. The method of claim 13, wherein the first processing module is further configured to divide the image into sub-images.

17. The method of claim 16, wherein the first processing module is further configured to identify intensities of the sub-image.

18. The method of claim 17, wherein the first processing module is further configured to identify the dark area of the image based on the intensities of the sub-image.

19. The method of claim 13, wherein the first processing module is further configured to identify the dark area of the image based on a product of a width and a height of the cluster of dark pixels being greater than an area threshold.

20. The method of claim 13, wherein the first intensity transformation is related to a maximum intensity inside the dark area and a minimum intensity of pixels immediately outside the dark area.

21. The method of claim 13, wherein the first intensity transformation is related to a maximum intensity inside the dark area and a minimum intensity of pixels at a small distance outside the dark area.

22. The method of claim 20, wherein the first intensity transformation is further related to a minimum intensity inside the dark area.

23. The method of claim 21, wherein the first intensity transformation is further related to a minimum intensity inside the dark area.

24. The method of claim 13, further comprising a third processing module configured to apply second intensity transformation to adjust intensities outside the dark area.

25. The method of claim 13, further comprising a display device configured to display the image and the detected dark areas, wherein an on-screen cursor is provided to select one of the detected dark areas, wherein the first intensity transformation is adjustable and is displayed on the display device and wherein the selected dark area is intensity stretched according to the adjusted first intensity transformation.

26. The method of claim 25, wherein the first intensity transformation is adjusted by a user using a pointing device associated with the cursor and a selection button.

* * * * *